US009857642B2

(12) United States Patent
Itou

(10) Patent No.: US 9,857,642 B2
(45) Date of Patent: Jan. 2, 2018

(54) DISPLAY DEVICE AND LIQUID CRYSTAL DISPLAY DEVICE

(71) Applicant: Japan Display Inc., Tokyo (JP)

(72) Inventor: Osamu Itou, Tokyo (JP)

(73) Assignee: Japan Display Inc., Tokyo (JP)

( * ) Notice: Subject to any disclaimer, the term of this patent is extended or adjusted under 35 U.S.C. 154(b) by 246 days.

(21) Appl. No.: 14/721,197

(22) Filed: May 26, 2015

(65) Prior Publication Data

US 2015/0338705 A1    Nov. 26, 2015

(30) Foreign Application Priority Data

May 26, 2014   (JP) .................................. 2014-108205

(51) Int. Cl.
*G02F 1/1335* (2006.01)
*G02F 1/1343* (2006.01)
*F21V 9/16* (2006.01)
*F21V 9/00* (2015.01)
*G02F 1/1368* (2006.01)
*G02F 1/1362* (2006.01)

(52) U.S. Cl.
CPC .......... *G02F 1/134363* (2013.01); *F21V 9/00* (2013.01); *F21V 9/16* (2013.01); *G02F 1/1368* (2013.01); *G02F 1/133605* (2013.01); *G02F 1/133606* (2013.01); *G02F 1/136286* (2013.01); *G02F 2001/133614* (2013.01)

(58) Field of Classification Search
CPC . G02F 1/134363; G02F 1/133605; F21V 9/00
USPC .......................................................... 349/61
See application file for complete search history.

(56) References Cited

U.S. PATENT DOCUMENTS

| 6,507,383 B1* | 1/2003 | Abe | G02F 1/134363 349/138 |
| 2002/0149729 A1* | 10/2002 | Nishimura | G02F 1/134363 349/141 |
| 2015/0042933 A1* | 2/2015 | Ueki | G02B 5/0242 349/108 |

FOREIGN PATENT DOCUMENTS

JP    2013-246303 A    12/2013

* cited by examiner

*Primary Examiner* — Lucy Chien
(74) *Attorney, Agent, or Firm* — Typha IP LLC

(57) ABSTRACT

The present invention realizes a high-definition and high-brightness display device with a high degree of energy efficiency. The above-described object can be realized by a display device including a display panel having a display surface and a backlight, wherein: the display panel has a wavelength conversion layer for each pixel on a surface parallel to the display surface, and has a light scattering layer between the wavelength conversion layers; the wavelength conversion layers have fluorescent materials; the light scattering layers have fine particles; a reflection layer is provided on the wavelength conversion layers on the backlight side; and a reflection layer is provided on the light scattering layers on the display surface side.

6 Claims, 14 Drawing Sheets

DISPLAY DEVICE AND LIQUID CRYSTAL DISPLAY DEVICE

CLAIM OF PRIORITY

The present application claims priority from Japanese Patent Application JP 2014-108205 filed on May 26, 2014, the content of which is hereby incorporated by reference into this application.

BACKGROUND

The present invention relates to a display device, and particularly to a liquid crystal display device having a backlight using fluorescent materials.

In a liquid crystal display panel used for a liquid crystal display device, a TFT substrate on which pixels having pixel electrodes and thin-film transistors (TFTs) are formed in a matrix and an opposed substrate facing the TFT substrate are disposed, and liquid crystal is sandwiched between the TFT substrate and the opposed substrate. An image is formed by controlling the transmission of light by liquid crystal molecules for each pixel.

Liquid crystal display devices that are currently available in the market include some field sequential liquid crystal display devices. However, color filter liquid crystal display devices that absorb white light beams from white light sources using color filters for color display are used in many cases. The transmission of color filters tends to be decreased along with an increase in the range of color reproduction, and the color filters are a main factor for a decrease in the energy conversion efficiency in the color filter liquid crystal display devices.

As a color display method other than the color filter system, there is a method using wavelength conversion by fluorescent materials in addition to the above-described field sequential system. Specifically, blue light sources or near-ultraviolet light sources are used for light sources, and source light beams are absorbed by a wavelength conversion layer to emit fluorescence. Thus, the source light beams are converted to light beams with longer wavelengths. Fluorescent materials are used for the wavelength conversion layer, and thus the display device using the wavelength conversion by the fluorescent materials is occasionally referred to as a fluorescent material display device in the specification.

Japanese Unexamined Patent Application Publication No. 2013-246303 describes such a display device. Japanese Unexamined Patent Application Publication No. 2013-246303 describes a configuration in which a monochromatic layer containing fluorescent materials is formed for each pixel, a light-absorbing layer is formed between the monochromatic layers containing the fluorescent materials, and a reflection film is formed between the monochromatic layer containing the fluorescent materials and the light-absorbing layer.

SUMMARY

In a display device for color display using fluorescent materials, the fluorescent materials have characteristics of a high degree of internal quantum efficiency, and it is necessary to improve the external quantum efficiency for utilization of the fluorescent materials. Specifically, fluorescence is isotropically propagated, and thus a ratio of emission in the direction ahead of the observer is extremely low without ingenuity. A structure of improving the external quantum efficiency by changing the direction of fluorescence moving into a layer or moving backward to the forward direction is referred to as a light extraction structure. However, the aperture ratio of the wavelength conversion layer is decreased in some light extraction structures. Further, a high collimate characteristic is required for a backlight source that excites the wavelength conversion layer in some cases. However, the backlight source with a high collimate characteristic is not preferable due to low efficiency.

Ingenuity is required for the light extraction structure in order to improve the external quantum efficiency of the fluorescent material display device without using collimated backlight, and further it is necessary to optimize the entire configuration of the fluorescent material display device. An object of the present invention is to realize a structure of improving the external quantum efficiency in such a fluorescent material display device.

The present invention solves the above-described problems, and the following is concrete means.

(1) A display device including a display panel having a display surface and a backlight, in which: the display panel has a wavelength conversion layer for each pixel on a surface parallel to the display surface, and has a light scattering layer between the wavelength conversion layers; the wavelength conversion layers have fluorescent materials; the light scattering layers have fine particles; a reflection layer is provided on the wavelength conversion layers on the backlight side; and a reflection layer is provided on the light scattering layers on the display surface side.

(2) The display device according to (1), in which the cross-section of each wavelength conversion layer is formed in a trapezoidal shape in which the width on the display surface side is larger than the width on the backlight side.

(3) The display device according to (1), in which the light scattering of each light scattering layer is large on the display surface side and small on the backlight side.

(4) The display device according to (3), in which the concentration of the fine particles in each light scattering layer is large on the display surface side and small on the backlight side.

(5) The display device according to (3), in which: a first light scattering layer obtained by dispersing first fine particles in a resist is formed on the display surface side, and a second light scattering layer obtained by dispersing second fine particles in the resist is formed on the backlight side in each light scattering layer; and the difference of the refractive index between the resist and the first fine particles is larger than the difference of the refractive index between the resist and the second fine particles.

(6) The display device according to (1), in which the reflection layer of the light scattering layers on the display surface side is formed in a grid shape so as to divide pixels.

(7) A display device including a display panel having a display surface and a backlight, in which: the display panel has wavelength conversion layers that emit red light beams, wavelength conversion layers that emit green light beams, and light transmission layers on a surface parallel to the display surface; light scattering layers are formed in areas sandwiched by the wavelength conversion layers that emit the red light beams, the wavelength conversion layers that emit the green light beams, and the light transmission layers; a reflection layer is provided on the wavelength conversion layers that emit the red light beams, the wavelength conversion layers that emit the green light beams, and the light transmission layers on the backlight side; the light scattering layers have a reflection layer on the display surface side; and the light source of the backlight is a blue LED.

(8) A display device including a display panel having a display surface and a backlight, in which: the display panel has wavelength conversion layers that emit red light beams, wavelength conversion layers that emit green light beams, and wavelength conversion layers that emit blue light beams on a surface parallel to the display surface; light scattering layers are formed in areas sandwiched by the wavelength conversion layers that emit the red light beams, the wavelength conversion layers that emit the green light beams, and the wavelength conversion layers that emit the blue light beams; a reflection layer is provided on the wavelength conversion layers that emit the red light beams, the wavelength conversion layers that emit the green light beams, and the wavelength conversion layers that emit the blue light beams on the backlight side; the light scattering layers have a reflection layer on the display surface side; and the light source of the backlight is an ultraviolet LED.

(9) A liquid crystal display device including a liquid crystal display panel in which a liquid crystal layer is sandwiched between a first substrate and a second substrate, and a backlight, in which: a pixel is formed in each area surrounded by scanning wirings and signal wirings on the first substrate; a pixel electrode connected to a TFT is formed in each pixel; wavelength conversion layers corresponding to the pixels are formed on the second substrate; a light scattering layer is formed between the wavelength conversion layers; the wavelength conversion layers have fluorescent materials; a reflection layer is formed on the wavelength conversion layers on the backlight side; and a reflection layer is formed on the light scattering layers on the liquid crystal layer side.

(10) A liquid crystal display device including a liquid crystal display panel in which a liquid crystal layer is sandwiched between a first substrate and a second substrate, and a backlight, in which: red pixels, green pixels, and blue pixels are formed in areas surrounded by scanning wirings and signal wirings on the first substrate; pixel electrodes connected to TFTs are formed in the red pixels, the green pixels, and the blue pixels; wavelength conversion layers that emit red light beams, wavelength conversion layers that emit green light beams, and light transmission layers corresponding to the red pixels, the green pixels, and the blue pixels, respectively, are formed on the second substrate; a light reflection layer is formed on the wavelength conversion layers that emit the red light beams, the wavelength conversion layers that emit the green light beams, and the light transmission layers on the backlight side; light scattering layers are formed in areas sandwiched by the wavelength conversion layers that emit the red light beams, the wavelength conversion layers that emit the green light beams, and the light transmission layers; a reflection layer is formed on the light scattering layers on the liquid crystal layer side; and the light source of the backlight is an LED that emits blue light beams.

(11) The liquid crystal display device according to (10), in which red color filters are disposed on the wavelength conversion layers that emit the red light beams on the liquid crystal layer side, and yellow color filters are disposed on the wavelength conversion layers that emit the green light beams.

(12) A liquid crystal display device including a liquid crystal display panel in which a liquid crystal layer is sandwiched between a first substrate and a second substrate, and a backlight, in which: red pixels, green pixels, and blue pixels are formed in areas surrounded by scanning wirings and signal wirings on the first substrate; pixel electrodes connected to TFTs are formed in the red pixels, the green pixels, and the blue pixels; wavelength conversion layers that emit red light beams, wavelength conversion layers that emit green light beams, and wavelength conversion layers that emit blue light beams corresponding to the red pixels, the green pixels, and the blue pixels, respectively, are formed on the second substrate; a light reflection layer is formed on the wavelength conversion layers that emit the red light beams, the wavelength conversion layers that emit the green light beams, and the wavelength conversion layers that emit the blue light beams on the backlight side; light scattering layers are formed in areas sandwiched by the wavelength conversion layers that emit the red light beams, the wavelength conversion layers that emit the green light beams, and the wavelength conversion layers that emit the blue light beams; a reflection layer is formed on the light scattering layers on the liquid crystal layer side; and the light source of the backlight is an LED that emits ultraviolet rays.

(13) The liquid crystal display device according to any one of (9) to (12), in which an antireflection film is formed while being overlapped with the scanning wirings, the signal wirings, and the TFTs of the first substrate.

(14) The liquid crystal display device according to any one of (9) to (13), in which the liquid crystal display panel is an IPS liquid crystal display device.

According to the present invention, a display device with a high degree of energy efficiency can be realized. Since the energy efficiency is high, the brightness of a screen can be secured as a high-definition screen. Further, since the energy efficiency is high, the battery life of the display device can be made longer.

DETAILED DESCRIPTION

Hereinafter, the content of the present invention will be described in detail using embodiments.

First Embodiment

Figure 1:
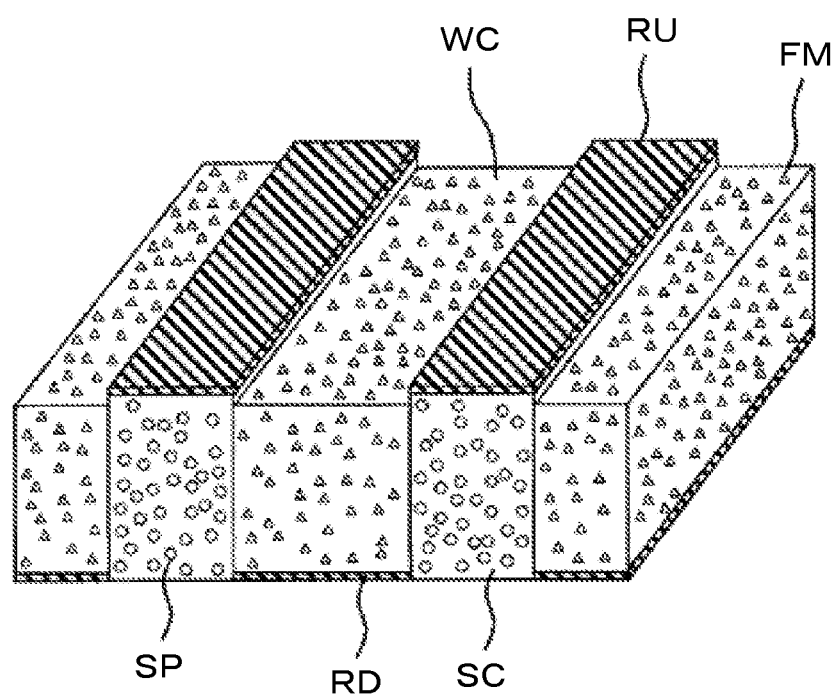
FIG. 1 is a perspective view of a first embodiment.

FIG. 1 shows a perspective view of a wavelength conversion structure of the present invention. On a substrate SU, light scattering layers SC and wavelength conversion layers WC are alternately formed while being adjacent to each other, and the cross-section of each of the light scattering layers SC and the light conversion layers WC is formed in a rectangular shape. A top reflection layer RU is provided at the top of each light scattering layer SC, and a bottom reflection layer RD is provided at the bottom of each light conversion layer WC. A process of realizing the structure of FIG. 1 will be shown below.

20 weight % of fine particles SP the average diameter of which is about 2 μm is mixed with a negative resist, and the negative resist having a thickness of 20 μm is applied to the substrate SU. As the fine particles, transparent metal oxide with a high refractive index such as alumina or titanium oxide can be used. The resultant substrate is exposed and developed to be patterned in a striped shape as shown in FIG. 1 so that the light scattering layers SC are formed. The width and gap of each light scattering layer SC are 25 μm, and the height of each light scattering layer SC is 50 μm. When aluminum is vapor-deposited on the light scattering layers SC, an aluminum film having a thickness of 200 nm is formed because the top and gap of each light scattering layer SC are flat. In addition, an aluminum film having a thickness of 100 nm that is thinner than the above is formed on each side surface of the light scattering layers SC because the side surface is substantially vertical.

The aluminum films on each top, gap, and side surface of the light scattering layers SC are wet-etched at substantially the same speed. When the aluminum films on the side surfaces of the light scattering layers SC are etched until the aluminum films are completely eliminated, the aluminum films each having a thickness of about 100 nm can be left at each top and gap of the light scattering layers SC. The aluminum film having a thickness of about 100 nm has a reflection ratio of about 85%, and is formed as a reflection layer RL. A metal film with a high reflection ratio is preferable for the reflection layer RL, and silver can be used other than aluminum.

Fluorescent materials FM are mixed with transparent ink for screen printing to be applied to the gaps between the light scattering layers SC so that the wavelength conversion layers WC are formed. Coumarin 6 is used for the fluorescent materials FM, and 0.3 weight % thereof is mixed with the transparent ink for screen printing. The coumarin 6 is an organic low molecule, and is dissolved in the transparent ink, resulting in monomolecular dispersion. Thus, the mixture of the transparent ink and the coumarin 6 is transparent. Specifically, in the case of the light scattering layers SC and the wavelength conversion layers WC that are alternately disposed while being adjacent to each other, the former has light scattering properties and the latter is transparent.

As the fluorescent materials FM used for the wavelength conversion layers WC, organic low molecules or quantum dots are appropriate in order to transparentize the mixture of the transparent medium such as transparent ink and the fluorescent materials. The quantum dots are semiconductor fine particles, and the wavelength of emission of light can be changed by changing the size of the particles. It should be noted that the transparency in this case means no light scattering properties and the excellent straight advancing ability of light.

The wavelength conversion layers WC include the fluorescent materials FM, and are transparent, not colorless transparent because the fluorescent materials FM absorb at a particular visible wavelength. If the organic low molecules or quantum dots form an assembly in the transparent ink and if the size thereof is sufficiently smaller than the visible wavelength, the wavelength conversion layers WC become transparent. However, the organic low molecules or quantum dots are preferably dispersed in a state of divided single molecules in order to prevent deterioration in internal quantum efficiency due to concentration quenching. In this case, the concentration quenching is a phenomenon that luminous efficiency is deteriorated when the concentration of particles is too high. Further, the internal quantum efficiency is luminous efficiency inside the fluorescent materials.

Figure 2:
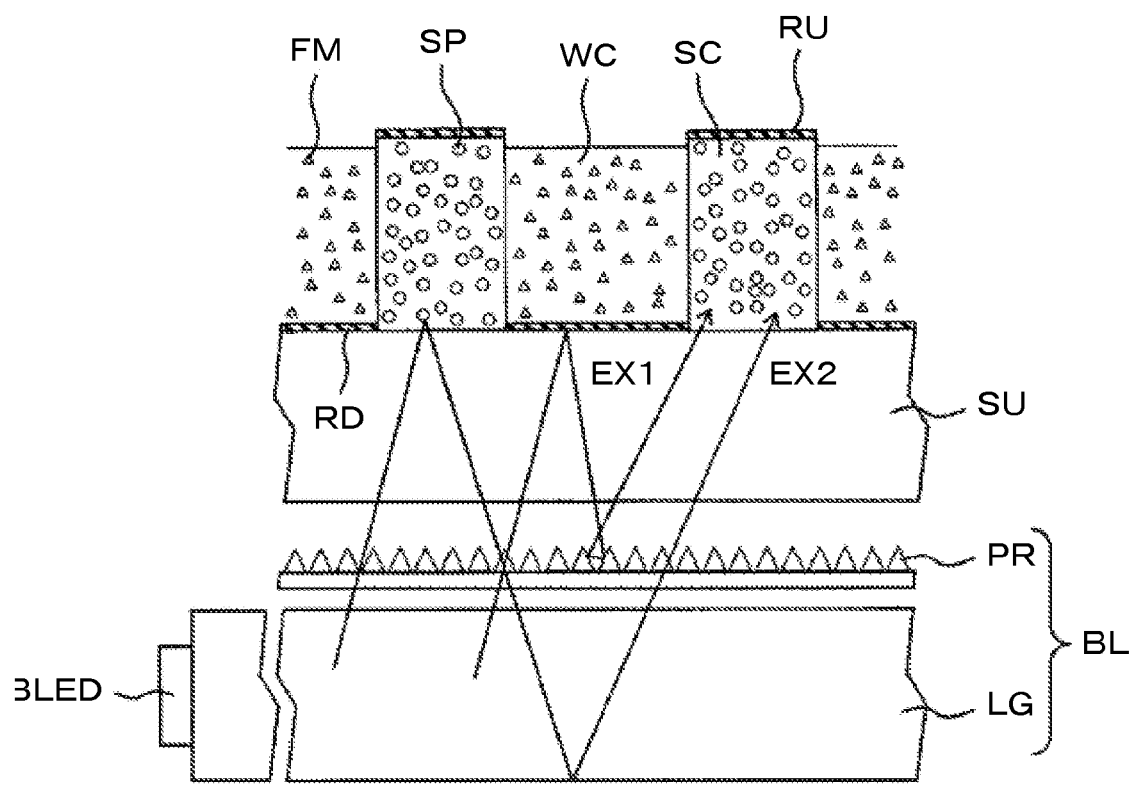
FIG. 2 is a cross-sectional view of the first embodiment.

As shown in FIG. 2, the wavelength conversion structure of the present invention is disposed on a backlight BL having a blue LED (Light Emitting Diode) BLED on a side surface. When the backlight BL is lighted, green fluorescence can be obtained. The all luminous flux amount of fluorescence emitted by directing the wavelength conversion structure of the present invention upward and the all luminous flux amount of source light emitted by directing the backlight BL forward are measured for comparison. The result shows that the former is about 70% of the latter.

In the backlight BL of FIG. 2, a prism sheet PR is provided on a light guide plate LG with the blue LED (BLED) disposed on the side surface. In addition thereto, a diffusion sheet and the like are disposed, but are not illustrated in FIG. 2. A reflective sheet is disposed under the light guide plate.

As shown in FIG. 2, a part of a light beam EX1 emitted from the light guide plate is reflected by the bottom reflection layer RD, but is reflected by the prism sheet again to enter the light scattering layer SC.

Thereafter, the light beam enters the light conversion layer WC. Another light beam EX2 is backscattered once in the light scattering layer SC, but is reflected by the reflective sheet under the light guide plate LG to enter the light scattering layer SC again. Thereafter, the light beam enters the light conversion layer WC. It should be noted that the light beam is reflected by not only the prism sheet PR and the reflective sheet, but also the interfaces of the light guide plate LG and the diffusion sheet.

Figure 3:
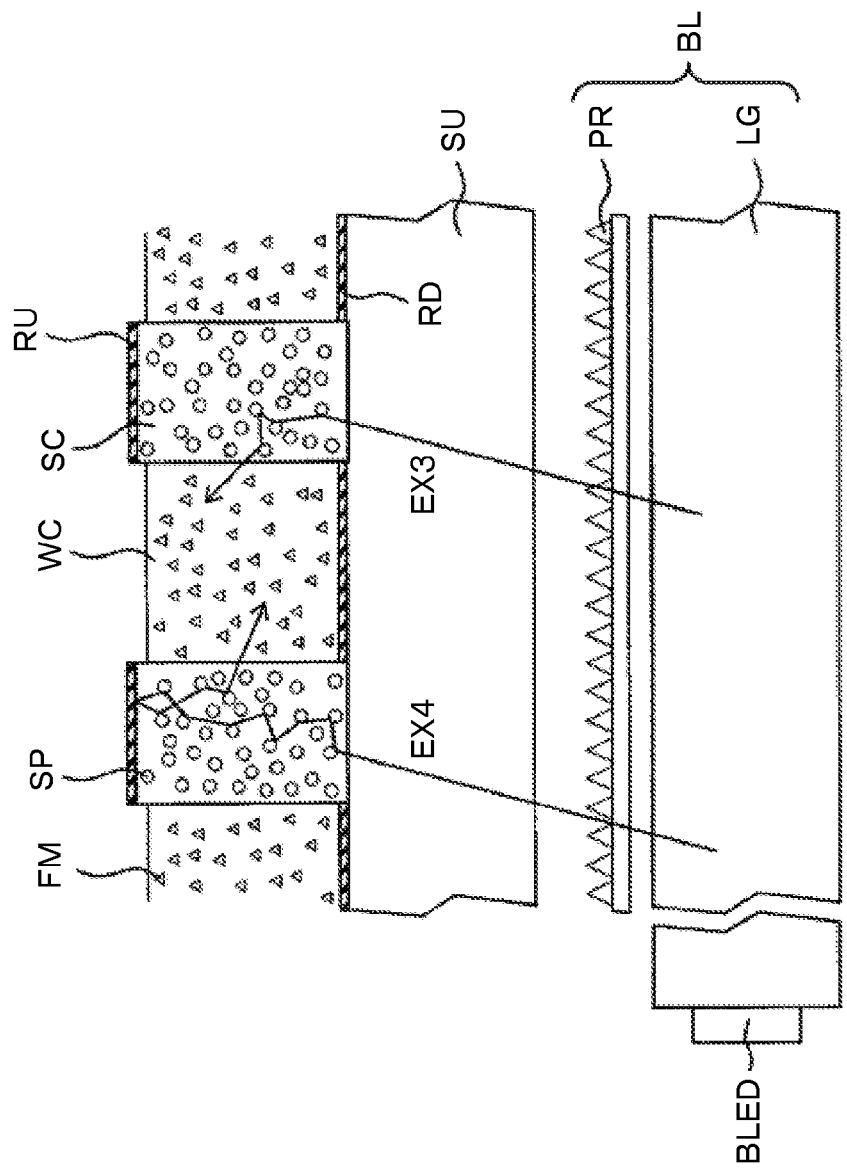
FIG. 3 is a cross-sectional view for showing an action of the present invention.
Figure 4:
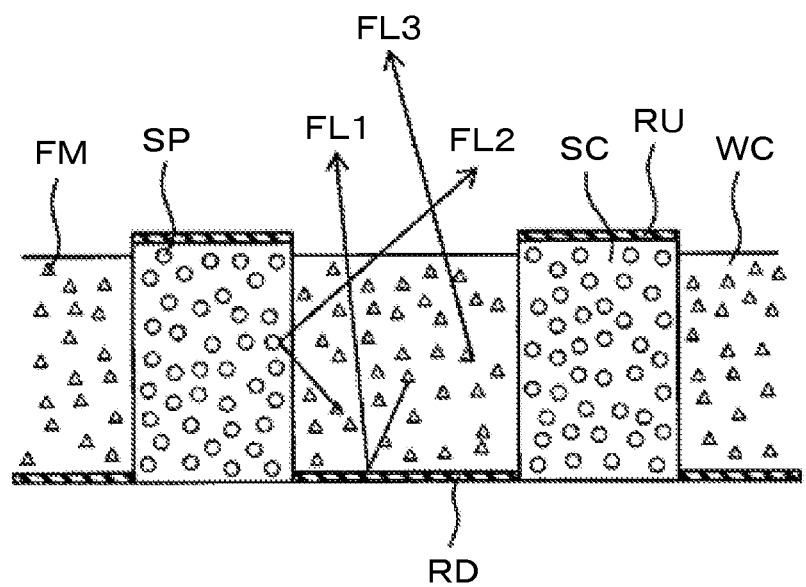
FIG. 4 is another cross-sectional view for showing an action of the present invention.

FIG. 3 is a cross-sectional pattern view for showing a state in which light beams EX3 and EX4 having entered the light scattering layers SC enter the wavelength conversion layer while being scattered. FIG. 4 is a cross-sectional pattern view for showing a state in which light beams with the wavelength converted by the fluorescent materials FM in the wavelength conversion layer WC are emitted to the direction of the display surface. The light beams are eradiated to various directions from the fluorescent materials FM. FL1 shows a state in which a light beam eradiated from the fluorescent materials FM to the backlight side is reflected by the bottom reflection layer RD to be emitted to the direction of the display surface. FL2 shows a state in which a light beam eradiated from the fluorescent materials FM to the side of the light scattering layer SC is scattered in the light scattering layer SC to be emitted to the direction of the display surface. FL3 shows a state in which a light beam is directly emitted from the fluorescent materials FM to the direction of the display surface.

Second Embodiment

Figure 5:
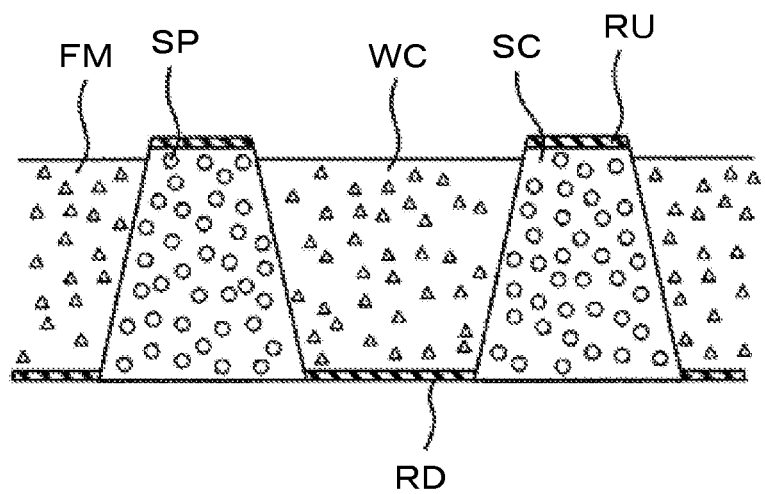
FIG. 5 is a cross-sectional view of a second embodiment.

In the wavelength conversion structure of the first embodiment, the exposure amount for the negative resist mixed with the fine particles SP is doubled, and the cross-sectional shape of each light scattering layer SC is formed in a trapezoidal shape as shown in FIG. 5. The cross-sections of the light scattering layers SC and the wavelength conversion layers WC are formed in forward tapered and inverse tapered shapes, respectively, and the interfaces between the light scattering layers SC and the wavelength conversion layers WC are allowed to be inclined. Fluorescence components that are generated in the wavelength conversion layer WC and are moved to the side surface enter the light scattering layer SC. However, the interface between the light scattering layer SC and the wavelength conversion layer WC is inclined, and thus the average emission direction is advantageously biased to the normal direction.

When the wavelength conversion structure of the present invention is used, a transparent medium is laminated on the upper surface for protection in some cases. Refraction occurs at the interface between the transparent medium and the air. For example, when the refractive index of the transparent medium is about 1.5, the incidence angle relative to the interface of the air needs to be 45 degrees or smaller in order for the light beam to emit to the outside of the transparent medium. In this case, the incidence angle is defined on the assumption that the normal line of the interface of the air is 0 degree. In the embodiment, the average emission direction of the light beam emitted from the light scattering layer SC and the wavelength conversion layer WC is biased to the normal direction. Thus, the ratio of emission to the outside of the transparent medium is increased to improve the efficiency.

Third Embodiment

Figure 6:
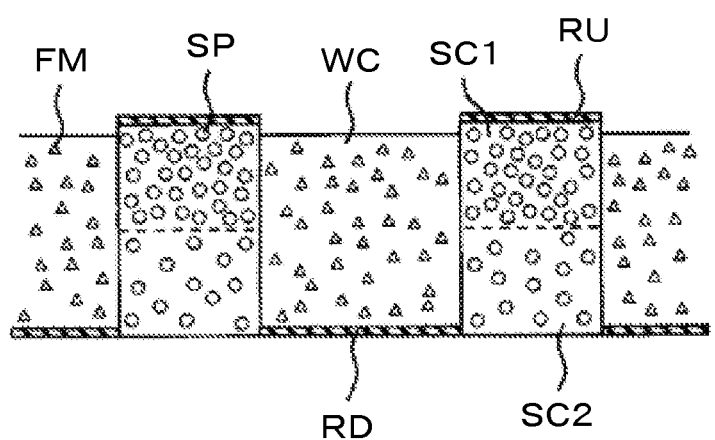
FIG. 6 is a cross-sectional view of a third embodiment.

In the wavelength conversion structure of the first embodiment, each light scattering layer is formed as a laminated body of a first light scattering layer SC1 and a second light scattering layer SC2 as shown in FIG. 6. The second light scattering layer SC2 is disposed on the side apart from the substrate SU, and the first light scattering layer SC1 is disposed on the side close to the substrate SU. In order to form each light scattering layer as a laminated body of the first light scattering layer SC1 and the second light scattering layer SC2, plural negative resists having different mixture ratios of the fine particles SP are prepared. First, a negative resist having a low mixture ratio is applied, and another negative resist having a high mixture ratio is applied thereon. Thereafter, the resultant substrate is exposed and developed at a time. For example, negative resists having mixture ratios of 15 weight % and 30 weight % of the fine particles SP are prepared, and may be sequentially applied.

As the mixture ratio of the fine particles SP in the negative resist becomes higher, the light diffusion properties are increased. Along with this, the backscatter tends to be increased. The backscatter is a phenomenon that a light beam is scattered on the incidence side. In the case of the present invention, the light beam enters the light scattering layer SC from the side of the substrate SU, and thus is returned to the side of the substrate SU again due to the backscatter. The wavelength conversion structure of the present invention has a light recycle effect. If the light beam can enter the light scattering layer SC at a time, the efficiency is improved. In the embodiment, the light scattering properties on the side of the substrate SU corresponding to the incidence side is reduced, so that the light beam can easily enter the light scattering layer SC at a time. After the light beam deeply enters the light scattering layer SC, the light beam is scattered in a layer having higher light scattering properties. Then, the light beam is directed to the light conversion layer WC. Accordingly, the wavelength conversion efficiency is improved by improving the incidence efficiency when the light beam enters the light scattering layer SC from the substrate SU.

Alternatively, the light scattering layer may be formed as three layers of the first light scattering layer SC1, the second light scattering layer SC2, and a third light scattering layer SC3. The light scattering layer in this case can be formed in such a manner that, for example, negative resists having mixture ratios of 10 weight %, 20weight %, and 30 weight % of the fine particles SP are prepared, and are sequentially applied and exposed.

Fourth Embodiment

Figure 7:
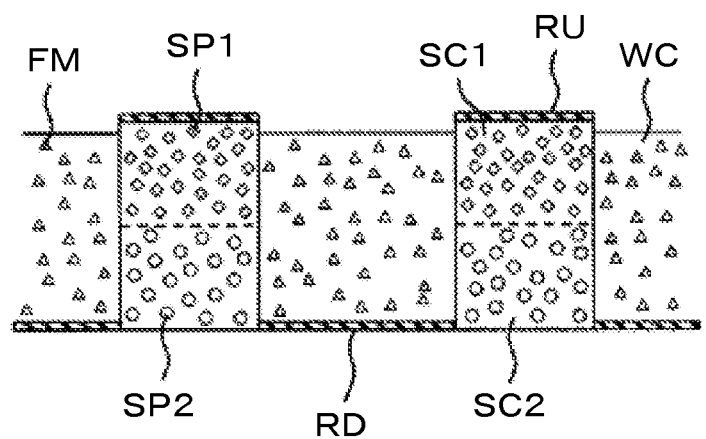
FIG. 7 is a cross-sectional view of a fourth embodiment.

In the wavelength conversion structure of the first embodiment, each light scattering layer is formed as a laminated body of a first light scattering layer SC1 and a second light scattering layer SC2 as shown in FIG. 7. Specifically, the first light scattering layer SC1 is mixed with first fine particles SP1 that are largely different from the negative resist in the refractive index, and the second light scattering layer SC2 is mixed with second fine particles SP2 that are slightly different from the negative resist in the refractive index.

As the combination of the first fine particles SP1 and the second fine particles SP2, for example, silica and alumina, or silica and titanium oxide may be used. In order to produce such a light scattering layer, a negative resist mixed with the fine particles SP2 is applied first, and a negative resist mixed with the first fine particles SP1 is applied thereon. Thereafter, the resultant substrate is exposed and developed at a time.

As the difference of the refractive index between the fine particles and the negative resist becomes larger, the light diffusion properties are increased. Along with this, the backscatter tends to be increased. In the embodiment, the light scattering properties on the side of the substrate SU corresponding to the incidence side is reduced, so that the light beam can easily enter the light scattering layer SC at a time. After the light beam deeply enters the light scattering layer SC, the light beam is scattered in a layer having higher light scattering properties. Then, the light beam is directed to the light conversion layer WC.

Accordingly, the wavelength conversion efficiency is improved by improving the incidence efficiency when the light beam enters the light scattering layer from the substrate SU. Further, unlike the third embodiment, the mixture ratio of the fine particles may be constant, and thus the viscosity of plural negative resists containing the fine particles is substantially constant. In addition, plural negative resists can be applied without changing the application conditions, and thus the light scattering layer can be easily produced.

In the embodiment, the difference of the refractive index between the negative resists and the fine particles in plural layers is used. Thus, the same resists are not necessarily used in the first and second layers, and different materials may be used for the resists in the first and second layers. For example, the difference of the refractive index between the first resist and the first fine particles is made larger than the difference of the refractive index between the second resist and the second fine particles, so that the same effect as in the above-described embodiments can be obtained.

Fifth Embodiment

Figure 8:
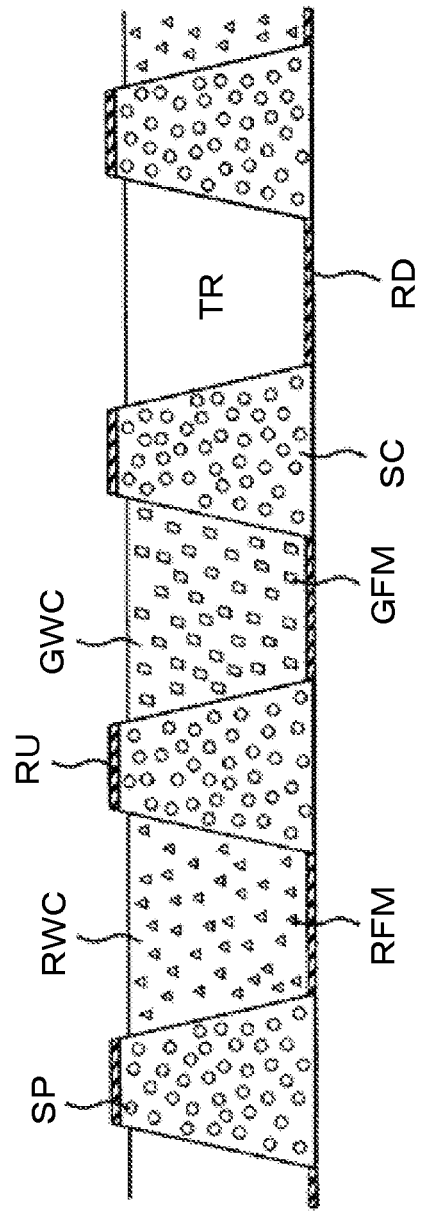
FIG. 8 is a cross-sectional view of a fifth embodiment.

In the wavelength conversion structure of the second embodiment, the wavelength conversion layer is configured using red wavelength conversion layers RWC and green wavelength conversion layers GWC as shown in FIG. 8. In addition to the red wavelength conversion layers RWC and the green wavelength conversion layers GWC, light transmission layers TR are disposed, and the red wavelength conversion layers RWC, the green wavelength conversion layers GWC, and the light transmission layers TR are repeatedly arranged. The red wavelength conversion layers RWC, the green wavelength conversion layers GWC, and the light transmission layers TR are formed so as to be distributed only in the gaps between the predetermined light scattering layers by screen printing. In addition, the following process may be used: a photoresist mixed with fluorescent materials is applied, and is exposed by using mask exposure so as to be left only at a predetermined portion, followed by development and patterning.

Similarly to the wavelength conversion layer WC of the first embodiment, the green wavelength conversion layer GWC is mixed with 0.3 weight % of coumarin 6 as fluorescent materials GFM, and the red wavelength conversion layer RWC is mixed with 0.3 weight % of DCM as red fluorescent materials RFM. Further, transparent ink itself is used for the light transmission layer TR. Similarly to the red wavelength conversion layer RWC and the green wavelength conversion layer GWC, the light transmission layer TR is closer to the light scattering layer SC. When the movement of a blue light beam from the inside of the light scattering layer SC to the light transmission layer TR is completed, the blue light beam becomes a diffused light beam. Thus, the blue light beam has angular distribution similarly to the red fluorescence of the red wavelength conversion layer RWC and the green fluorescence of the green wavelength conversion layer GWC. In addition, the wavelength is not converted in the light transmission layer TR, and thus the blue light beam of the backlight is emitted as it is. The red, green, and blue light beams are emitted from the red wavelength conversion layer RWC, the green wavelength conversion layer GWC, and the light transmission layer TR, respectively. Accordingly, the blue light beam of the backlight can be converted to a white light beam. In addition, each color has substantially the same angular distribution, and thus a white light beam with a wide viewing angle can be obtained.

In this case, since the wavelength of the blue light beam is not converted, there is no loss caused by the internal quantum efficiency of the fluorescent materials, and the blue light beam is intensified more than those of other colors in some cases. Thus, the white light beam becomes tinged with blue. In this case, for example, if the area occupied by each light transmission layer TR is reduced less than those occupied by each red wavelength conversion layer RWC and green wavelength conversion layer GWC, the color of the white light beam can be closer to an achromatic color.

Sixth Embodiment

Figure 9:
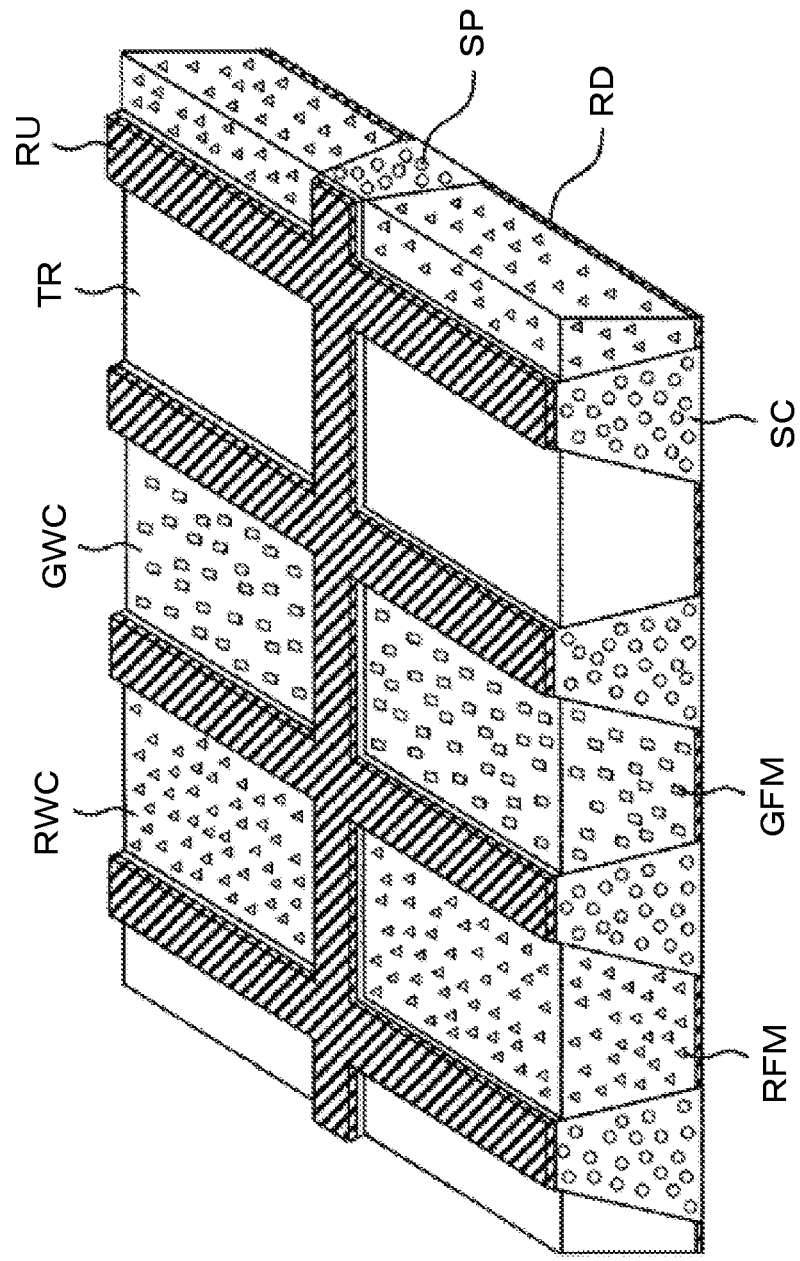
FIG. 9 is a cross-sectional view of a sixth embodiment.

In the wavelength conversion structure of the fifth embodiment, the planar distribution of light scattering layers SC is formed in a grid shape as shown in FIG. 9, and red wavelength conversion layers RWC, green wavelength conversion layers GWC, and light transmission layers TR are repeatedly arranged in the grid. In the fifth embodiment, the red wavelength conversion layers RWC, the green wavelength conversion layers GWC, and the light transmission layers TR are arranged in a striped shape, and the polar angle distribution of fluorescence slightly differed between the azimuth including the extension direction of the stripe and the azimuth including the vertical direction thereof. Specifically, the polar angle distribution slightly differs because while there is a backscatter effect by the light scattering layers SC shown by FL2 in FIG. 2 in the vertical direction of the extension direction of the stripe, there is no backscatter effect by the light scattering layers SC in the extension direction of the stripe.

In the embodiment, the planar distribution of the light scattering layers SC is formed in a grid shape to generate the backscatter effect by the light scattering layers SC in any azimuth. Accordingly, the polar angle distribution of fluorescence can be substantially equalized between the azimuth including the extension direction of the stripe and the azimuth including the vertical direction.

Seventh Embodiment

Figure 10:
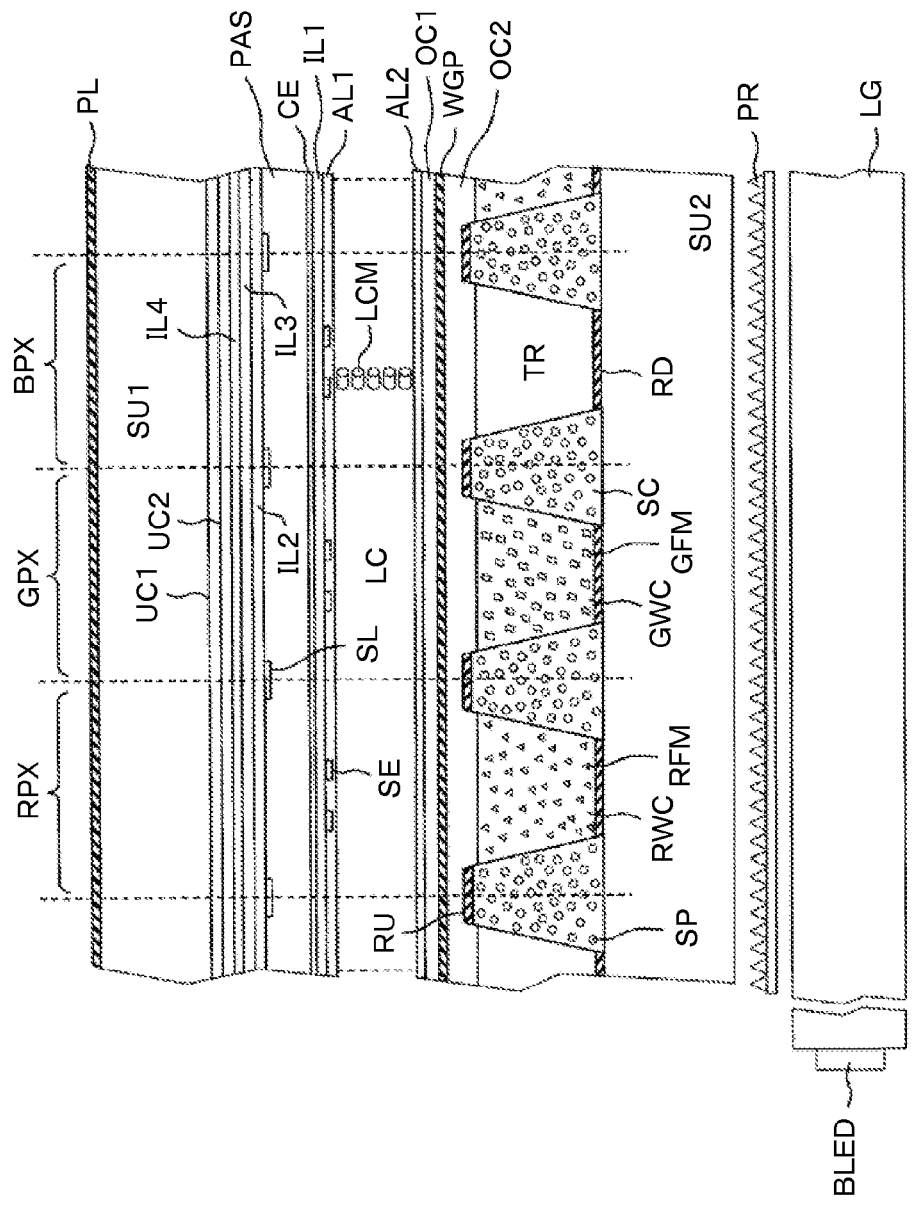
FIG. 10 is a cross-sectional view of a seventh embodiment.
Figure 11:
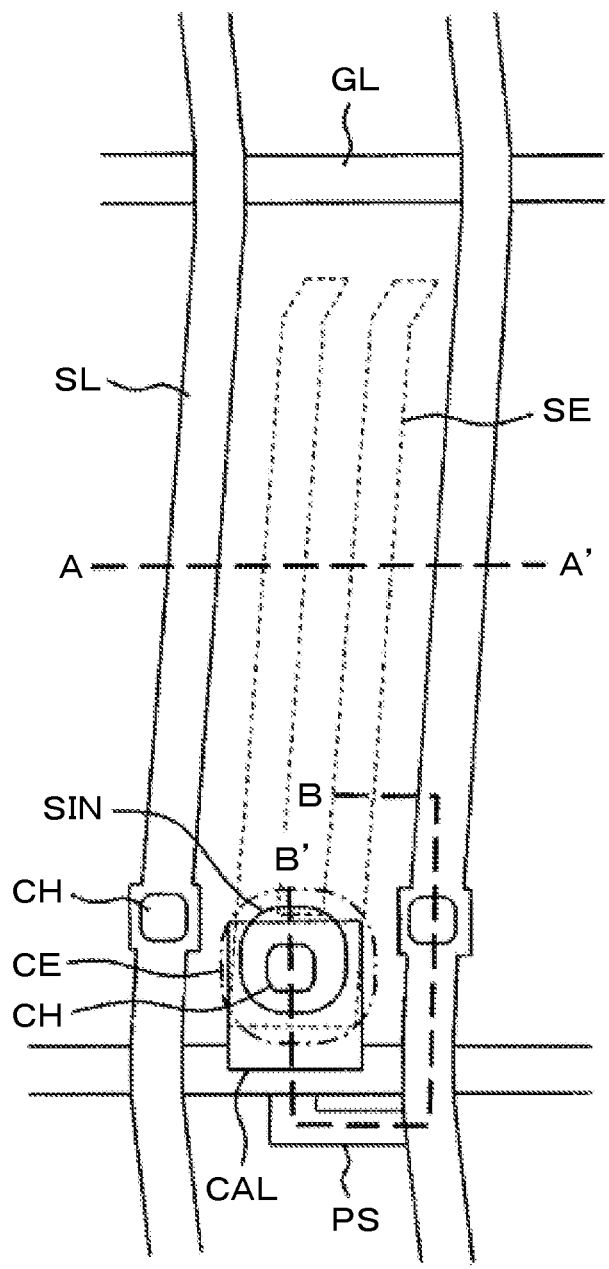
FIG. 11 is a plan view of the seventh embodiment.
Figure 12:
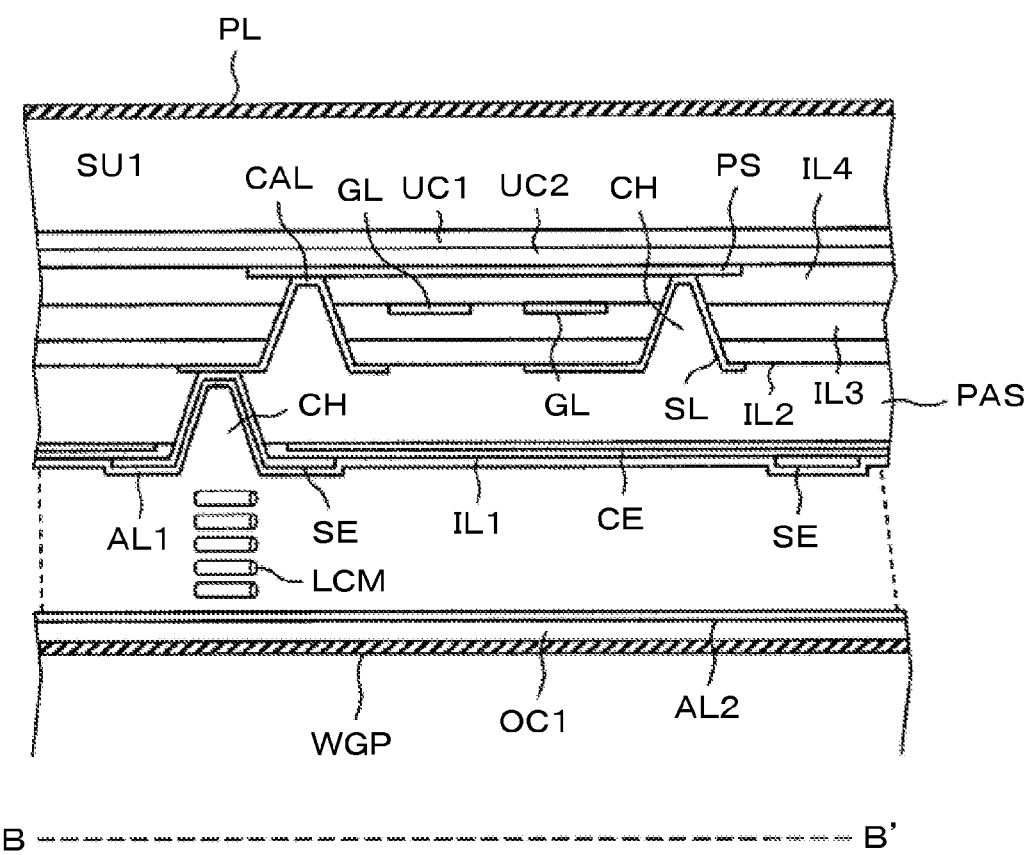
FIG. 12 is a cross-sectional view including a TFT of the seventh embodiment.

In the embodiment, the wavelength conversion structure of the sixth embodiment is applied to a liquid crystal display device. In the liquid crystal display device of the embodiment, as shown in FIG. 10, a liquid crystal layer LC is sandwiched mainly between a first substrate SU1 and a second substrate SU2, peripheral circuits are provided around the first substrate, and further a driving circuit is connected to the first substrate SU1. FIG. 11 shows a plan view of one pixel of the liquid crystal display device of the embodiment. FIG. 12 shows a cross-sectional view taken along the line BB' described in FIG. 11.

FIG. 12 is a cross-sectional view including active elements, and FIG. 10 is a cross-sectional view taken along the line AA' of FIG. 11. In FIG. 10 and FIG. 12, on the first substrate SU1, provided are, from the side close to the liquid crystal layer LC, a first alignment film AL1, a source electrode SE, a first insulating film IL1, a common electrode CE, an organic passivation film PAS serving as a flattening film, a second insulating film IL2, a signal wiring SL, a third insulating film IL3, a scanning wiring GL, a fourth insulating film IL4, a polysilicon layer PS, a first undercoat layer UC1, and a second undercoat layer UC2. The second insulating film IL2 is omitted in some cases.

On the second substrate SU2, a second alignment film AL2, a first flattening film OC1, a polarization layer WGP, a second flattening film OC2, and a wavelength conversion structure are sequentially formed from the side close to the liquid crystal layer LC. The wavelength conversion structure has the same configuration as the sixth embodiment.

Each of the source electrode SE and the common electrode CE is made of ITO (Indium Tin Oxide), and the both are laminated through the first insulating film IL1 that is a silicone nitride film. An overlapped portion between the source electrode SE and the common electrode CE forms a retentive capacity that keeps the electric potential of the liquid crystal layer LC constant in a retention period. The source electrode SE has a two-comb-teeth structure in one pixel, and the common electrode CE is formed in a flat planar shape. The both are separated by the first insulating film IL1 that is a silicone nitride film, and a fringe electric field is formed between the source electrode SE and the common electrode CE.

The liquid crystal display device having such a system is referred to as an FFS (Fringe Field Switching) system, and the FFS is a kind of IPS (In Plane Switching) system because an electric field is applied in the direction parallel to the plane of the liquid crystal layer LC. In the IPS system, an electrode to drive the liquid crystal layer is formed only on the first substrate SU1, and the structure of the second substrate SU2 having the wavelength conversion structure can be more simplified. The source electrode SE is connected to the signal wiring SL through a polysilicon layer PS, a base film CAL, and a contact hole CH, and applies electric potential in accordance with an image signal to the liquid crystal layer LC. It should be noted that the base film CAL is formed in the same layer as the signal wiring SL.

In FIG. 11, the scanning wirings GL are arranged in a second direction while extending in a first direction. Further, the signal wirings SL are arranged in the first direction while extending in the second direction. A pixel is formed in an area surrounded by the scanning wirings GL and the signal wirings SL. The signal wirings SL and the scanning wirings GL intersect with each other, and the polysilicon layer PS is formed near the intersecting area to function as an active element. It should be noted that the first insulating film IL1 and the common electrode CE are distributed in the entire area except the vicinity of the contact hole in the pixel, and thus hole portions of the first insulating film IL1 and the common electrode CE around the contact hole are illustrated using a solid line SIN and a dashed-dotted line CE in FIG. 11, respectively.

The liquid crystal layer LC has positive dielectric constant anisotropy in which the dielectric constant in the alignment direction is larger than that in the vertical direction. In addition, the liquid crystal layer LC has high resistivity, and exhibits a nematic phase in a wide temperature range including room temperature. The alignment state of the liquid crystal layer LC when no voltage is applied is homogeneous alignment, and the alignment direction when no voltage is applied is schematically shown in FIG. 10 using cylindrical liquid crystal molecules LCM. When the fringe electric field by the common electrode CE and the source electrode SE is applied, the alignment state of the liquid crystal layer LC is changed so that the azimuth is rotated. The first alignment film AL1 and the second alignment film AL2 are aligned by a rubbing method or an optical alignment method. Liquid crystal having negative dielectric constant anisotropy in which the dielectric constant in the alignment direction is smaller than that in the vertical direction can be applied to the liquid crystal layer LC. In this case, the alignment process direction should be shifted by 90 degrees from the direction illustrated in FIG. 10.

A polarization plate PL is disposed on the first substrate SU1, and the transmission axes of the polarization plate PL and the polarization layer WGP are set so as to be orthogonal to each other when viewed from the normal direction of the liquid crystal panel. In addition, the transmission axis of the polarization layer WGP is parallel to the alignment direction of the liquid crystal layer LC. The axes of the polarization plate PL, the polarization layer WGP, and the liquid crystal layer LC are disposed as described above, so that dark display can be obtained when no voltage is applied and bright display can be obtained when voltage is applied. The polarization plate PL includes a dye with anisotropic alignment, and the polarization layer WGP is a wire grid-type polarizer configured using metal thin lines at pitches of 50 µm.

The wavelength conversion structure on the second substrate SU2 is disposed while being matched with the pixels of the first substrate SU1. The dashed lines of FIG. 10 denote boundaries of the pixels, and the light scattering layers SC and the signal wirings SL are located on the dashed lines. Specifically, the light scattering layers SC that emit no light in the wavelength conversion structure are located immediately below the signal wirings SL on the first substrate SU1, and the red wavelength conversion layers RWC, the green wavelength conversion layers GWC, and the light transmission layers TR are located immediately below the source electrodes SE of red pixels RPX, green pixels GPX, and blue pixels GPX, respectively. It should be noted that the red pixels RPX, green pixels GPX, and blue pixels GPX are pixels to each of which voltage corresponding to each of red, green, blue image signals is applied.

A backlight BL having a blue LED (Light Emitting Diode) BLED on a side surface is disposed under the second substrate SU2. The red wavelength conversion layers RWC and the green wavelength conversion layers GWC convert the blue light beams into red light beams and green light beams, respectively, and the light transmission layers TR allow the blue light beams to transmit without converting the wavelength. The horizontal width and vertical width of each pixel on the first substrate SU1 are 17 µm and 51 µm, respectively. The repeated cycle of the wavelength conversion structure on the second substrate SU2 is similarly set, and the first substrate SU1 and the second substrate SU2 are disposed so that the both match each other as shown in FIG. 10. FIG. 10 shows that the matched pixels, the red wavelength conversion layer RWC, the green wavelength conversion layer GWC, and the light transmission layer TR are connected in rows using the dashed lines. Accordingly, the light beams emitted from the red wavelength conversion layer RWC, the green wavelength conversion layer GWC, and the light transmission layer TR are selectively irradiated onto the corresponding pixels.

As described above, the liquid crystal display device of the embodiment converts the wavelength of the blue source light beams for color display, and thus a high degree of efficiency can be obtained as compared to a liquid crystal display device that colors white light beams using color filters. Further, the wavelength conversion structure of the embodiment has a light recycle effect, and there is no special restriction for angular distribution of source light beams. Thus, the collimate characteristic is not necessary.

Eighth Embodiment

In the liquid crystal display device of the seventh embodiment, an antireflection layer RF is formed on the signal wiring SL and the gate wiring GL of the first substrate SU1. In the liquid crystal display device of the seventh embodiment, outside light is reflected by the signal wiring SL and the scanning wiring GL to reduce the contrast ratio in some cases. Further, when outside light enters the polysilicon layer PS, photo current is generated in some cases. Voltage is applied to a pixel that is supposed to display black, and thus the contrast ratio is also reduced in this case.

Figure 13:
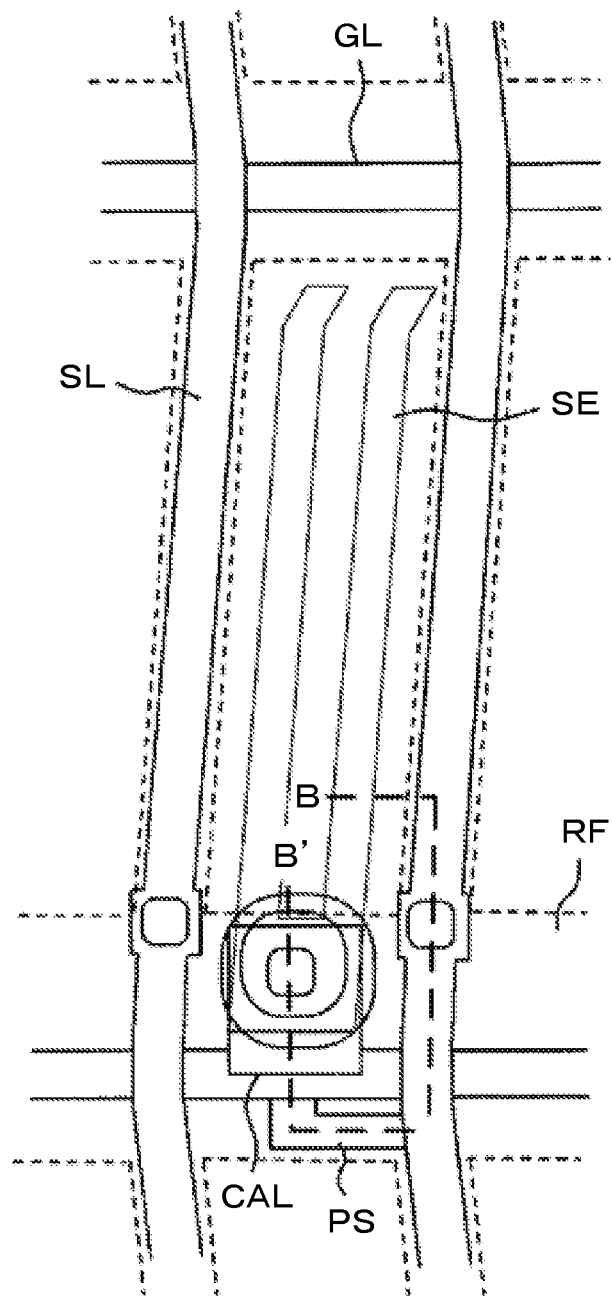
FIG. 13 is a plan view of an eighth embodiment.
Figure 16:
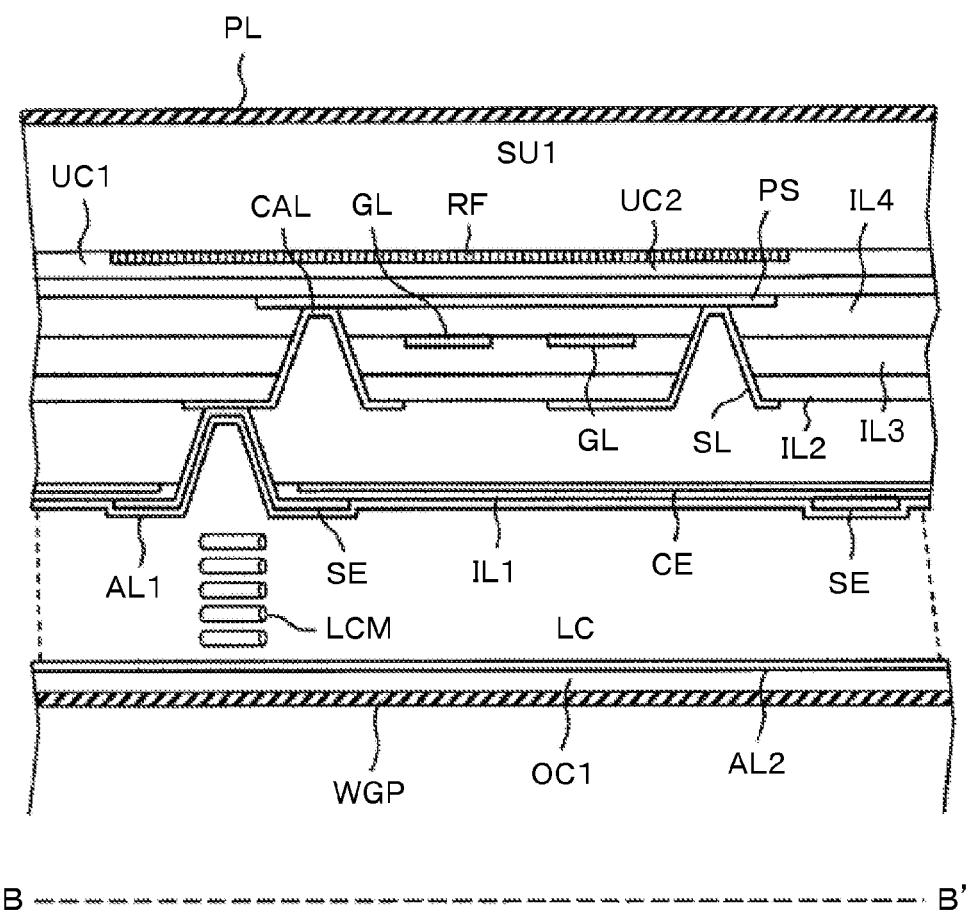
FIG. 16 is a cross-sectional view of the eighth embodiment.

FIG. 13 shows a plan view of one pixel of a liquid crystal display device of the embodiment. As shown by the dashed lines in FIG. 13, the antireflection layer RF is distributed to cover the signal wirings SL, the scanning wirings GL, and the polysilicon layer PS. The antireflection layer RF may be a chromium film having a chromic oxide layer disposed on the side nearer the first substrate SU1 than the signal wirings SL, the scanning wirings GL, and the polysilicon layer PS as shown in, for example, the cross-sectional view of FIG. 16, or carbon particles may be dispersed. Accordingly, the visibility can be advantageously improved in a lighted environment such as the outside in fine weather. In addition, the same effect can be obtained when the antireflection layer is formed on a surface close to the first substrate SU1 of the signal wirings SL and the scanning wirings GL.

Ninth Embodiment

In the liquid crystal display device of the seventh embodiment, an outside light excitation prevention layer for preventing generation of fluorescence by a light beam entering from the outside is disposed. The wavelength conversion layer of the present invention is located under a first polarization plate PL, a liquid crystal layer LC, and a second polarization plate WGP. Therefore, when a light beam from the outside enters the wavelength conversion layer, the light beam passes through the first polarization plate PL1, the liquid crystal layer LC, and the second polarization layer WGP. Thus, the light beam enters at an intensity associated with image information. However, the red wavelength conversion layers RWC and the green wavelength conversion layers GWC emit fluorescence, whereas the light transmission layers TR emit no fluorescence. Thus, there is a possibility of image degradation such as hue changes due to the incidence of outside light outdoors in the daytime.

Figure 14:
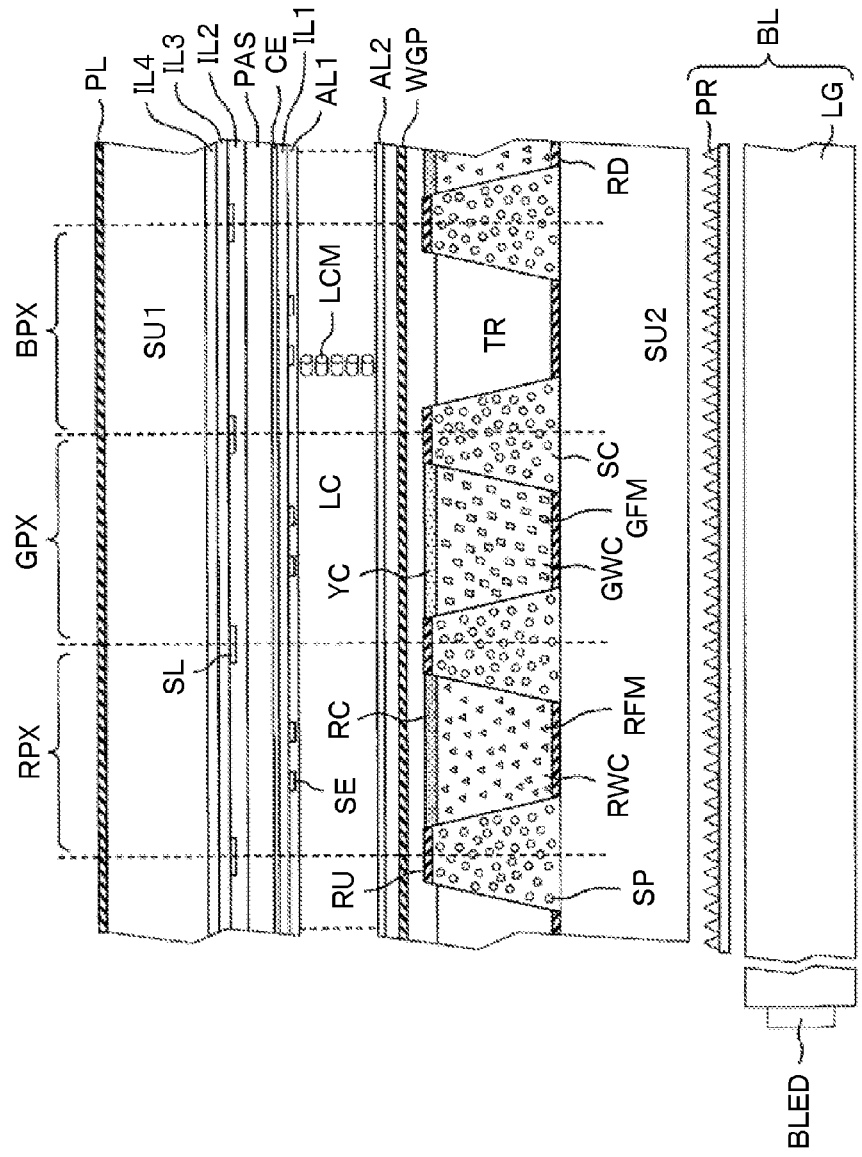
FIG. 14 is a cross-sectional view of a ninth embodiment.

FIG. 14 shows a cross-sectional view of a liquid crystal display device of the embodiment. A yellow color filter YC and a red color filter RC are laminated on each green wavelength conversion layer GWC and red wavelength conversion layer RWC, respectively. The green wavelength conversion layers GWC are excited by blue light beams. However, if the yellow color filters YC that absorb the blue light beams are laminated thereon, the excitation by the incidence of the blue light beams can be prevented. The red wavelength conversion layers RWC are excited by blue and green light beams. However, if the red color filters RC that absorb the blue and green light beams are laminated thereon, the excitation by the incidence of the blue and green light beams can be prevented. Accordingly, the image quality can be prevented from being deteriorated even outdoors in the daytime.

Tenth Embodiment

Figure 15:
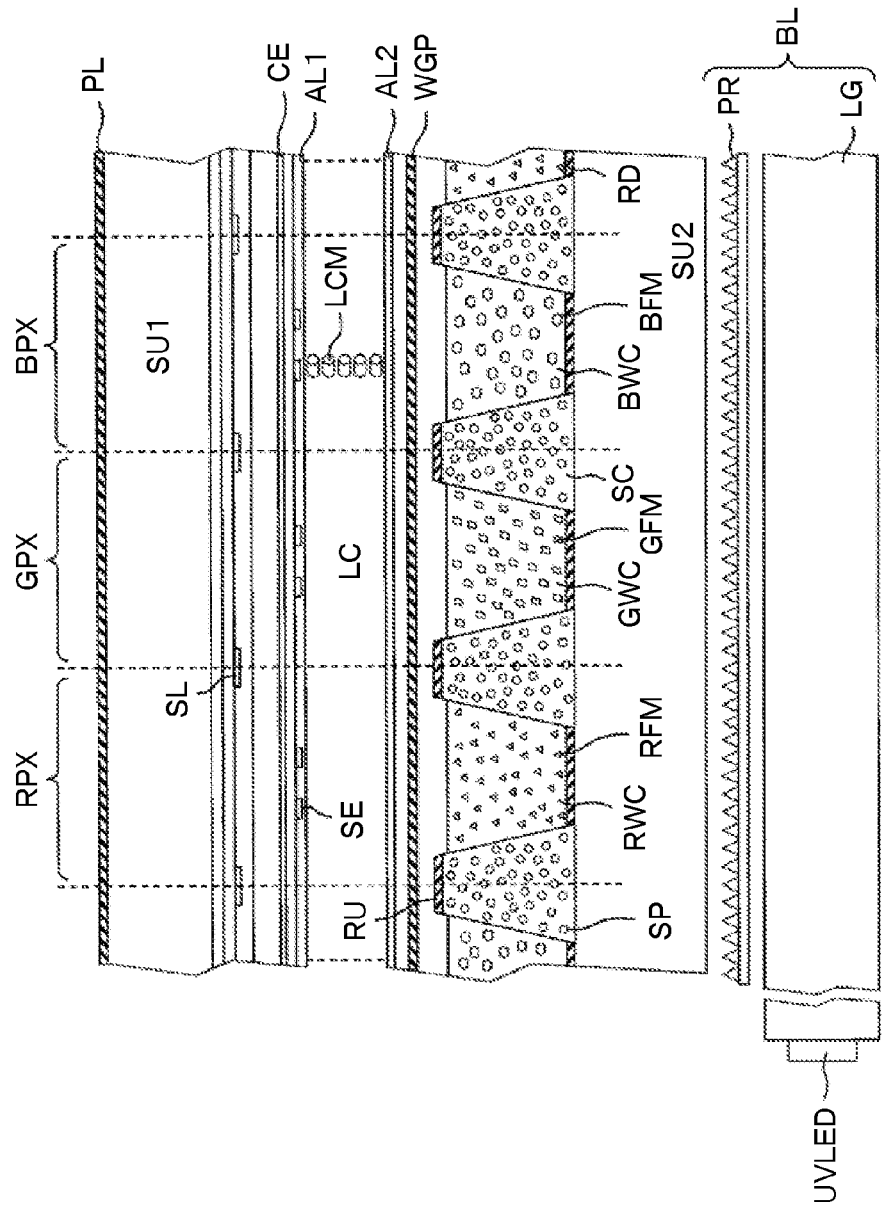
FIG. 15 is a cross-sectional view of a tenth embodiment.

FIG. 15 is a cross-sectional view for showing the embodiment. In the embodiment, an LED (UVLED) that emits near-ultraviolet light is used for the backlight BL in the liquid crystal display device of the seventh embodiment. Instead of the light transmission layers TR, blue wavelength conversion layers BWC containing blue fluorescent materials BFM are used, and the wavelength of the source light is converted by the blue wavelength conversion layers BWC to display blue light. When the wavelength of the blue light beam is not converted as in the fifth embodiment, only the blue light beam has no loss due to the internal quantum efficiency of the fluorescent materials. Thus, the blue light beam is intensified more than those of other colors in some cases. The wavelength of the blue light beam is converted in the embodiment. Thus, even if the area ratio of the blue wavelength conversion layers BWC, the green wavelength conversion layers GWC, and the red wavelength conversion layers RWC is equalized, the white color can be close to an achromatic color.

What is claimed is:

1. A display device comprising a display panel having a display surface and a backlight,
wherein
the display panel has a wavelength conversion layer for each pixel on a surface parallel to the display surface, and has a light scattering layer between the wavelength conversion layers;
the wavelength conversion layers have fluorescent materials;
the light scattering layers have fine particles;
a reflection layer is provided on the wavelength conversion layers on the backlight side;
a reflection layer is provided on the light scattering layers on the display surface side,
the light scattering of each light scattering layer is large on the display surface side and small on the backlight side, and
the concentration of the fine particles in each light scattering layer is large on the display surface side and small on the backlight side.

2. The display device according to claim 1, wherein the cross-section of each wavelength conversion layer is formed in a trapezoidal shape in which the width on the display surface side is larger than the width on the backlight side.

3. The display device according to claim 1, wherein the reflection layer of the light scattering layers on the display surface side is formed in a grid shape so as to divide pixels.

4. A display device comprising a display panel having a display surface and a backlight,
wherein
the display panel has a wavelength conversion layer for each pixel on a surface parallel to the display surface, and has a light scattering layer between the wavelength conversion layers;
the wavelength conversion layers have fluorescent materials;
the light scattering layers have fine particles;
a reflection layer is provided on the wavelength conversion layers on the backlight side;
a reflection layer is provided on the light scattering layers on the display surface side,
the light scattering of each light scattering layer is large on the display surface side and small on the backlight side,
a first light scattering layer obtained by dispersing first fine particles in a resist is formed on the display surface side, and a second light scattering layer obtained by dispersing second fine particles in the resist is formed on the backlight side in each light scattering layer; and
the difference of the refractive index between the resist and the first fine particles is larger than the difference of the refractive index between the resist and the second fine particles.

5. The display device according to claim 4, wherein the cross-section of each wavelength conversion layer is formed in a trapezoidal shape in which the width on the display surface side is larger than the width on the backlight side.

6. The display device according to claim 4, wherein the reflection layer of the light scattering layers on the display surface side is formed in a grid shape so as to divide pixels.

* * * * *